United States Patent Office 2,703,271
Patented Mar. 1, 1955

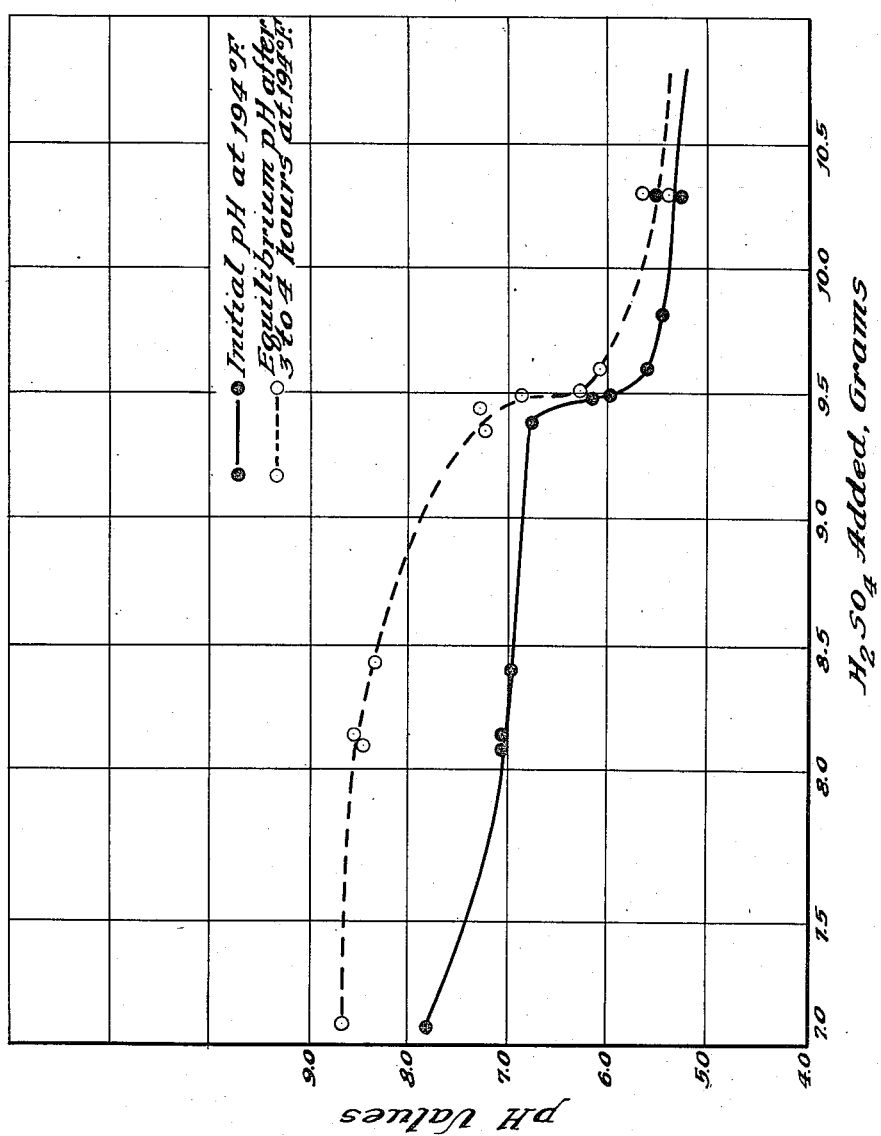

2,703,271

RECOVERY OF URANIUM FROM AQUEOUS SOLUTIONS

James F. Shea, Columbus, Ohio, and Melvin G. Willigman, Elgin, Ill., assignors to the United States of America as represented by the United States Atomic Energy Commission Application March 18, 1952, Serial No. 277,104

1 Claim. (Cl. 23—14.5)

This invention deals with the recovery of uranium from ores such as carnotite ores, and in particular from sodium carbonate-leach solutions obtained from such ores.

Carnotite is a vanadate of uranium and potassium of the formula $K_2O.2U_2O_3.V_2O_5.2H_2O$. For the study which led to the present invention a so-called Wild Steer carnotite was used which contained 0.34% uranium. The ore was roasted with 10% of its weight of sodium chloride at 1520° F.; it was then leached with a hot 3% solution of sodium carbonate, and the solution was repeatedly used for new batches of ore for the purpose of enrichment. The solution finally obtained and used for all of the experiments described later contained 2.51 gms. U/l and 33.57 gms. $V_2O_5$/l. This solution will be referred to hereafter as "initial solution."

When uranium was precipitated from solutions of the above described type by adding mineral acid, for instance sulfuric acid, it was always difficult to operate at optimum conditions, which means to obtain a quantitative uranium precipitation and a minimum amount of precipitated vanadium. This problem was even encountered when the amount of acid added was measured.

It is an object of this invention to provide a process for the recovery of uranium from carbonate-complexed uranium- and vanadium-containing solutions by which the above mentioned disadvantage is overcome. More specifically it is an object of this invention to provide a process of quantitatively precipitating uranium from carbonate-complexed uranium- and vanadium-containing solutions whereby a minimum amount of vanadium is coprecipitated.

A great number of experiments were carried out with the above described initial solution. The solution was heated, and mineral acid was added in increments while the mixture was stirred, and the pH of the solution was ascertained after each acid addition.

In all instances it was found that a curve plotted to show the function between the amount of acid added and the pH values obtained had a pronounced inflection point and that this inflection point coincided with the instance when uranium precipitation could be brought to completion within the shortest period of time. When acid was added beyond the inflection point, vanadium precipitation set in to an essential degree.

In the accompanying drawing, two such curves established with the initial solution and under the conditions set forth in the following are illustrated. To 250 ml. of the "initial solution" having a temperature of 194° F., 9.56 N sulfuric acid was gradually added. The solid curve contains the pH measurements made immediately after addition of acid and precipitation, while the broken curve shows the pH values determined from three to four hours after each acid addition when equilibrium was reached; agitation was applied during this time. It is obvious from the diagram that during the waiting and agitation period the pH values had increased, and it is also evident that at the inflection point this increase of the pH value is at a minimum and almost negligible. These curves thus demonstrate that addition of acid just to the inflection point brings about optimal results with regard to quantitative uranium precipitation, minimum time necessary to reach equilibrium, and minimum vanadium precipitation.

The process of this invention accordingly consists in precipitating uranium values from carbonate-complexed aqueous solutions of uranium and vanadium by adding mineral acid until the inflection point of a pH-acid curve is reached.

The operating conditions used in the experiments for plotting the curves shown in the drawing and stated above were also employed for the experiments discussed below. In some instances, the quantity of uranium in the precipitate was ascertained by analyzing the supernatant and then calculating from the analytical results the quantity of uranium present in the precipitate.

It does not matter whether the inflection is determined immediately after precipitation or after waiting for several hours or even after the precipitate had been removed from the solution and the solution cooled to room temperature, since the inflection point is always located at the same point, which means it occurs after the same quantity of acid has been added, provided, of course, that the conditions were held consistent for each curve.

It was also found that after the precipitate formed at, or shortly beyond, the inflection point was filtered off, further precipitation in the filtrate often occurred. This confirmed that the time factor had some bearing on the degree of uranium precipitation, as shown in the graphs. Parallel tests were made to study the effects of heating or holding time on the completeness of the uranium precipitation period. Again, for each experiment 250 ml. of the initial solution were used and neutralized with 9.50 gms. of sulfuric acid at a temperature of 194° F. The pH values were measured (a) immediately after precipitation and (b) after waiting for from two to four hours to obtain equilibrium. The results of these tests are presented in Table I.

Table I

| pH Values | | Heating time after precipitation, hrs. | Uranium precipitated, percent |
|---|---|---|---|
| After precipitation, 194° F. | Equilibrium, 194° F. | | |
| 6.2 | 7.2 | 4 | 100 |
| 6.0 | 7.3 | 2 | 100 |
| 6.2 | 7.2 | 1 | 92 |
| 6.2 | 7.2 | 0 | 80 |

The data of Table I show that complete precipitation of the uranium in the solution was obtained when the solution, at 194° F., was acidified to a pH value of 6.2 and maintained at that temperature for two or four hours. Only 92% of the uranium was precipitated after one hour of waiting, while only 80% were precipitated when the solution, after acid addition, was allowed to stand overnight at room temperature. It appears that, under the conditions of these experiments, the time required to obtain equilibrium and to precipitate the uranium completely was in the order of two hours.

In order to obtain more definite information, however, on the heating time required for complete uranium precipitation, another series of experiments was carried out. Samples of 250 ml. of the initial solution were acidified with various quantities of 9.56 N sulfuric acid whereby mixtures were obtained which had pH values of 5.3, 6.8, 7.0, 7.1, and 7.9, respectively. These acidified solutions were kept at a constant temperature of 194° F., and the pH values were measured for each solution. In all instances, the curves obtained by plotting heating time against pH values assumed a constant level at about 105 minutes which shows that a minimum time of about 105 minutes is necessary, for a temperature of 194° F., to obtain constant pH values. Analysis of the filtrates indicated that, after 105 minutes, uranium precipitation was complete in all instances except in the solution which had a pH value of 7.9 immediately after precipitation.

A further study was made to investigate the effect of the pH value on the completeness of uranium precipitation. The pH values were measured immediately after precipitation and at the equilibrium point at 194° F. The uranium content of the precipitate formed was determined by analyzing the filtrates as well as the precipitates. The uranium content of the initial solution was again 2.51 gms. uranium/l. The results are compiled in Table II.

Table II

| pH Values | | Uranium precipitated, percent | Color of precipitate |
|---|---|---|---|
| Initial, at 194° F. | At Equilibrium, at 194° F. | | |
| 7.9 | 8.6 | 59 | Canary Yellow. |
| 7.1 | 8.3 | 100 | Do. |
| 7.1 | 8.6 | 100 | Do. |
| 6.9 | 7.7 | 100 | Do. |
| 6.2 | 7.2 | 100 | Do. |
| 6.0 | 7.3 | 100 | Do. |
| 5.6 | 6.1 | 100 | Orange tan. |
| 5.3 | 5.6 | 100 | Do. |
| 5.2 | 5.3 | 100 | Do. |

Complete precipitation occurred at pH value ranges of from 7.1 to 5.2 (measured immediately after precipitation) and of from 8.3 to 5.3 after waiting until the equilibrium had been reached. For immediate measurement, after acid addition, the value of about 7.1 seems to be critical, since as small a change as from 7.9 to 7.1 brings about a yield increase of from 59% to 100%.

However, the color of the precipitate indicated that at higher pH values, namely, from 7.1 to 6.0 (measured immediately after acid addition) the precipitate was yellow, and very little vanadium was contained in the precipitate, while at the lower pH values, when the precipitate was orange-tan, a higher vanadium content was present. Therefore, pH values in the range of from 8.3 to 7.2 measured at the equilibrium and in the range of from 7.1 to 6.0 measured immediately after acid addition were preferred. The pH values between 6.0 and 6.2 were the most advantageous ones, because in this range the pH values of the "immediate curve" and of the "equilibrium curve" are so close that relatively little waiting is necessary. However, a longer waiting time is never harmful and sometimes even advantageous because it improves agglomeration or crystallization and thus facilitates filtration.

Three of the precipitates obtained at "immediate pH values" of 7.1, 6.2, and 5.2, respectively, were analyzed for their relative uranium and vanadium contents. The results are compiled in Table III.

Table III

| pH at precipitation | Weight ratio, $U:V_2O_5$ |
|---|---|
| 7.1 | 1.59:1 |
| 6.2 | 1.49:1 |
| 5.2 | 0.69:1 |

The data contained in this Table III confirm what the color of the precipitate had already suggested, namely, that at higher pH values less vanadium is coprecipitated and thus better separation is obtained.

The precipitate may be separated from the supernatant by filtration, centrifugation or decantation.

By adding further amounts of acid to the solution after the precipitate has been removed, a relatively pure vanadium compound may then be precipitated.

While all the experiments described above were carried out with solutions of 194° F., other temperatures have also been found suitable, and curves based on other temperatures were found to have the inflection point at the same quantity of acid added. For instance, a temperature of 176° F., was found suitable; however the precipitation rate was slower. At 176° F., the pH values were found to be from about 0.2 to 0.3 higher than the corresponding pH values at 194° F.

It will be understood that for further separation the precipitate may be dissolved and subjected to a new precipitation cycle. It will also be understood that mineral acids other than sulfuric acid, for instance hydrochloric acid, may be used for the process of this invention. Likewise, carbonate-complexed uranium solutions derived from ores other than carnotite are suitable.

It will also be understood that this invention is not to be limited to the specific details given herein but that it may be modified within the scope of the appended claim.

What is claimed is:

A process of obtaining a quantitative precipitation of uranium values and a minimum coprecipitation of vanadium values from a leach liquor obtained by extracting a carnotite ore with an aqueous solution of sodium carbonate which comprises heating said leach liquor to 194° F., adding sulfuric acid thereto until an immediate pH value of 6.0 to 7.1 is attained, holding the reaction mixture at said temperature of 194° F. for from about 2 to 4 hours, and then separating the uranium containing precipitate from the supernatant liquor.

References Cited in the file of this patent

UNITED STATES PATENTS 1,065,581 Bleecker _____ June 24, 1913

OTHER REFERENCES

Ebelman, Annales de Chimie et de Physique (Ser. 3), vol. 5, pp. 204–5 (1842). (Copy in Scientific Library.)

Taylor, A Treatise on Physical Chemistry, vol. II, pp. 992–927 (1931). D. Van Nostrand Co., New York. (Copy in Scientific Library.)

Britton, Hydrogen Ions, pages 277–285 (1929), pub. by D. Van Nostrand, New York. (Copy in Scientific Library.)